(12) United States Patent
Lee

(10) Patent No.: US 8,631,156 B2
(45) Date of Patent: Jan. 14, 2014

(54) SYSTEMS AND METHODS FOR PROVIDING NETWORK RESOURCE ADDRESS MANAGEMENT

(75) Inventor: Jeffery T. Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 12/903,110

(22) Filed: Oct. 12, 2010

(65) Prior Publication Data

US 2012/0089712 A1    Apr. 12, 2012

(51) Int. Cl.
*G06F 15/16*    (2006.01)

(52) U.S. Cl.
USPC ........................................ 709/245

(58) Field of Classification Search
USPC ............. 709/223–229, 245; 714/48; 707/713, 707/721
See application file for complete search history.

(56) References Cited

U.S. PATENT DOCUMENTS

| | | | |
|---|---|---|---|
| 6,934,753 B2* | 8/2005 | Kim | 709/225 |
| 6,976,019 B2* | 12/2005 | Davallou | 1/1 |
| 7,325,045 B1* | 1/2008 | Manber et al. | 709/219 |
| 7,634,463 B1 | 12/2009 | Katragadda et al. | |
| 2004/0210532 A1* | 10/2004 | Nagawa et al. | 705/51 |
| 2005/0027882 A1* | 2/2005 | Sullivan et al. | 709/244 |
| 2006/0112094 A1* | 5/2006 | Sullivan et al. | 707/5 |
| 2007/0100890 A1 | 5/2007 | Kim | |
| 2008/0320167 A1* | 12/2008 | Collignon | 709/245 |
| 2009/0210807 A1 | 8/2009 | Xiao et al. | |
| 2009/0216868 A1 | 8/2009 | Gao et al. | |
| 2009/0287705 A1* | 11/2009 | Schneider | 707/9 |
| 2011/0004850 A1* | 1/2011 | Lodico et al. | 715/838 |

* cited by examiner

*Primary Examiner* — Brendan Higa
(74) *Attorney, Agent, or Firm* — Novak Druce Connolly Bove + Quigg LLP

(57) ABSTRACT

Systems and methods are provided for allowing a user to obtain an intended network resource address. An undesired network resource address (NRA) which had been mistakenly entered by a user may be identified as being undesired. In response, an intended NRA may be determined and provided to the user. For example, a database of undesired NRAs may be access to determine an intended NRA (e.g., based on an association of the undesired NRA with an intended NRA). The undesired NRA database may be located local to or remote from the user equipment. The NRA database may be updated in response to, for example, receiving an undesired address command from the user.

9 Claims, 10 Drawing Sheets

SYSTEMS AND METHODS FOR PROVIDING NETWORK RESOURCE ADDRESS MANAGEMENT

BACKGROUND

The present disclosure is generally directed to managing access to network resources and, more particularly, to preventing a user from unintentionally accessing undesired network resources.

With the promulgation of the Internet, the number of network resource addresses, including the number of phishing, advertisement-heavy, and non-content pages that prey on those who type in a network resource address incorrectly, has grown substantially. From the viewpoint of a user in a web browsing environment, it may be difficult to resolve minor variations in network resource addresses, such as web addresses. This may increase the difficulty a user faces when trying to reach an intended destination in a web browsing environment. For example, a user looking for information about Apple Inc. products on the web may inadvertently reach an undesired web destination, such as aapple.com, appl.com, or any other number of web sites preying upon the misspelling of apple.com.

A user may not always browse the web via bookmarks. For example, there may be web sites that a user may visit by typing the URL into the address bar of a web browser and, in some cases, allow the web browser to auto-complete the remainder of the URL address. If the user had at one time entered an address incorrectly, later when the user attempts to go to the same intended address, the web browser may auto-complete the address with the incorrect address.

For example, a user may occasionally access the web site http://www.apple.com. Variants of the apple.com site may include appl.com, appl.tv, and applemacs.com, among others. The user may access one of these variants by accident. The user may also click on a variant web link, such as applemacs.com, mistaking it for a site the user desires, such as apple.com.

With some web browsers, once a user types in an address, the browser remembers that address and suggests it to the user again in the future when it determines that user is attempting to enter that same address. In this example, some time later, the user may type in "appl" and the web browser may suggest appl.com which is not the user's intended destination. If the user selects appl.com again, it becomes even more likely for the web browser to suggest it in the future due to the heuristic algorithms used by the web browser.

SUMMARY OF THE DISCLOSURE

In some embodiments, systems and methods are provided for accessing an intended network resource address (NRA) even when information corresponding to an inputted NRA corresponds to an undesired NRA. NRA information may be received and processed to determine whether the information corresponds to an undesired NRA. When the NRA information corresponds to an undesired NRA, an intended NRA may be identified and a function may be performed based on the intended NRA.

BRIEF DESCRIPTION OF THE DRAWINGS

Features of the disclosure, its nature, and various advantages will be apparent upon consideration of the following detailed description, taken in conjunction with the accompanying drawings, in which like reference characters refer to like parts throughout, and in which.

DETAILED DESCRIPTION OF EMBODIMENTS

Figure 1:
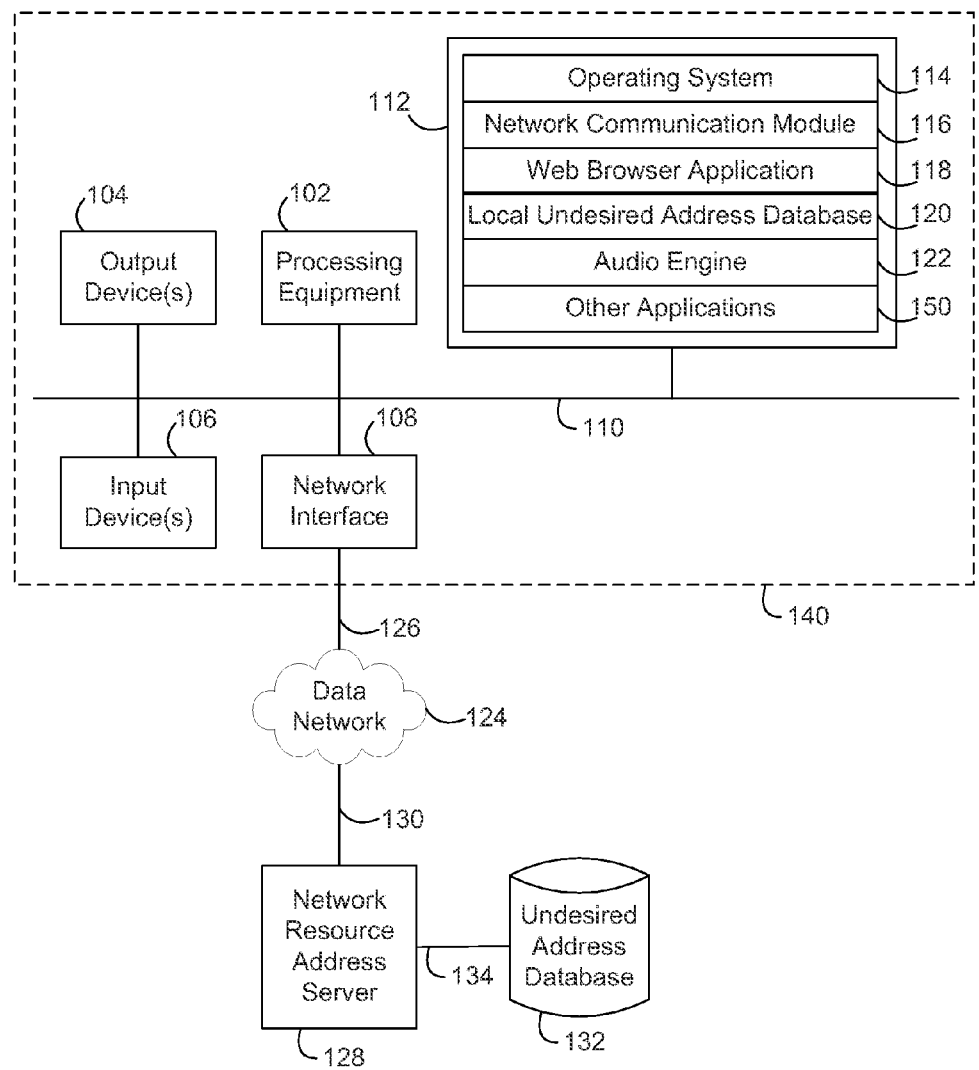
FIG. 1 is a block diagram of an illustrative network resource address management system in accordance with some embodiments.

The network resource address management systems and methods of the present disclosure may be used for guiding users to their intended network destination. The features of the present disclosure are generally described in the context of an network resource address (NRA) management application. A network resource address (NRA) is any suitable information that may be used to identify a particular network resource or group of resources. For example, an NRA may be a uniform resource locator (URL), an internet web page address, a file transfer protocol (FTP) address, a local area network address, any other suitable address, or any combination thereof. An NRA management application may be any suitable software, hardware, or both for implementing and performing the functionality described in the present disclosure. For example, the NRA management application may be a web browser, web browser plug-in, web browser button, motion gesture, stand-alone application, any other suitable application, or any combination thereof.

In some embodiments, an undesired address command or control may be implemented as part of the NRA management application. Activation of this command or control in connection with a particular NRA may, for example, indicate to the NRA management application to not access or provide as a suggestion, the associated NRA in the future. The NRA management application may also, for example, ask the user what site the user wanted to go to or otherwise associate the undesired address to the address the user intended.

In some embodiments, the undesired NRA may, for example, be uploaded to a central server and used in connection with maintaining a central database of undesired NRA's that other users may use in connection with their own use of respective NRA management applications.

In some embodiments, the NRA management application may determine undesired NRAs, intended NRAs, or both based on user preference information. Preference information may include, for example, an indication that the user prefers content that does not contain too many advertisements, pop-up windows, any other suitable attribute, or any combination thereof. For example, if a user prefers a particular provider of news content, then the NRA management application may determine that an NRA that was mistakenly entered by the user believing it would lead to a desired news content resource is an undesired NRA if, in fact, the NRA management application determines that the entered NRA corresponds to an undesired NRA according to the user's preferences.

In some embodiments, the NRA management application may determine undesired NRAs, intended NRAs, or both based on temporal information. For example, if a user inputs more than one NRA within a predefined time window (e.g., a few seconds), the NRA management application may determine that the first NRA corresponds to an undesired NRA and the last NRA corresponds to a desired NRA.

In some embodiments, the NRA management application may automatically preview web pages and store NRA information in one or more undesired address databases based on the number of advertisements, lack of relevant content, any other suitable property, or any combination thereof. For example, the NRA management application may store a "parked page", such as appl.com, in an undesired address database due to the large number of advertisements and relative lack of relevant content.

In some embodiments, the NRA management application may remove undesired web pages from a listing of NRA recommendations, any other suitable listing, or any combination thereof. For example, the NRA management application may forego providing appl.com as a recommendation when a user enters "appl" in a web browser address field.

In some embodiments, the NRA management application may alter the appearance of an undesired address in a listing of NRA recommendations, any other suitable listing, or any combination thereof. For example, an undesired address may be highlighted, have a different color, have a different font, be associated with a graphic icon, be differentiated in any other suitable manner, or any combination thereof.

In some embodiments, the NRA management application may automatically redirect a user from an undesired address or web link to an NRA that is not stored in an undesired address database. For example, the NRA management application may access content from apple.com in response to a user inputting appl.com.

In some embodiments, the NRA management application may prompt a user to confirm an undesired address, NRA recommendation, any other suitable action, or any combination thereof. For example, the NRA management application may ask the user to confirm appl.com as an undesired address in response to the user selecting an undesired address command on the web browser. The NRA management application may, for example, ask the user if the user meant to input apple.com in response to the user inputting appl.com. If the user says yes, the NRA management application may provide content for or otherwise redirect to the desired site apple.com.

Illustrative features of the present disclosure are described with reference to FIGS. 1-10 below.

FIG. 1 is a block diagram of an illustrative network resource address management system 100 for providing NRA management in accordance with some embodiments of the present disclosure. System 100 is one example of a suitable architecture used in connection with implementing an NRA management application having NRA management capabilities. In some embodiments, other architectures may be used and may include more or fewer components than those illustrated.

System 100 may include user equipment 140, which may include, for example, one or more of the following components: processing equipment 102, output device 104, input device 106, network interface 108, modules 112, any other suitable component, or any combination thereof. In some embodiments, user equipment may be referred to as a user device or user devices.

In some embodiments, components 102, 104, 106, 108, 112, any other suitable component, or any combination thereof may be part of a single installation or device, including but not limited to: a personal computer, a laptop, a tablet computer, an in-vehicle computer, a gaming computer, a personal computer television (PC/TV), a PC media server, a PC media center, a game console or device, an email device, a personal digital assistant, a smartphone, a mobile telephone, an internet phone, a satellite phone, a portable video player, a portable music player, a portable gaming machine, a wifi enabled laptop, netbook, or tablet computer, a 3G (or other cellular network) enabled laptop, netbook, or tablet computer, any other suitable device, or any combination thereof. For example, user equipment 140 may be a tablet computer running on the Internet.

In some embodiments, components 102, 104, 106, 108, 112, any other suitable component, or any combination thereof may be implemented as separate devices. For example, components 104 and 106 may be included in a smartphone while components 102, 108, and 112 are included in a PC/TV.

In some embodiments, components 102, 104, 106, 108, 112, any other suitable component, or any combination thereof may exchange communications and data over communications path 110, which may be any suitable wired, wireless, or both path and which may use any suitable hardware, software, or both for facilitating the transfer of data and control signals between components. Communications path 110 may include one or more communications paths, such as a satellite path, a fiber-optic path, a cable path, a path that supports Internet communications, free-space connections (e.g., for broadcast or other wireless signals), one or more busses, any other suitable wired or wireless communications path, or any combination of such paths.

In some embodiments, the components shown in system 100 may be coupled with each other via communications paths, such as those described above in connection with paths 110, as well other short-range point-to-point communications paths, such as USB cables, IEEE 1394 cables, SVGA (Super Video Graphics Array) cables, wireless paths (e.g., Bluetooth, infrared, IEEE 802-11x, any other suitable wireless path, or any combination thereof), or other short-range communication via wired or wireless paths. BLUETOOTH is a certification mark owned by Bluetooth SIG, INC. The system components may also be coupled with each other through one or more indirect paths via data network 124. Communications path 110 may be provided by one or more of these communications paths, but is shown as a single path in FIG. 1 to avoid overcomplicating the drawing.

Processing equipment 102 may include any suitable software, hardware, or both for processing data. For example, processing equipment 102 may include any suitable processing circuitry such as one or more microprocessors (e.g., dual-core Intel® Xeon® Processors), microcontrollers, digital signal processors, programmable logic devices, any other suitable device, or any combination thereof. INTEL and XEON are registered trademarks owned by Intel Corporation.

In some embodiments, processing equipment 102 may include circuitry suitable for communicating with data network 124, NRA server 128, or other networks or servers. In some embodiments, communications circuitry may be represented as network interface 108 and may be coupled to data network 124 through communications path 126. This circuitry may include, for example, a cable modem, an integrated services digital network (ISDN) modem, a digital subscriber line (DSL) modem, a telephone modem, a wireless modem, any other suitable communications device, or any combination thereof.

Communications path 126 may include one or more communications paths, such as a satellite path, a fiber-optic path, a cable path, a path that supports Internet communications, a path that supports free-space connections (e.g., for broadcast or other wireless signals, IEEE 802-11x, any other suitable path, or any combination thereof), one or more busses, any other suitable wired or wireless communications path, or any combination of such paths. Communications path 126 may be provided by one or more of these communications paths, but is shown as a single path in FIG. 1 to avoid overcomplicating the drawing.

Data network 124 may be one or more networks including the Internet, a mobile phone network, mobile device (e.g., Blackberry) network, cable network, public switched telephone network, wifi network, satellite network, local area network (LAN), wireless local area network (WLAN), or other types of communications network or combinations of communications networks. BLACKBERRY is a service mark owned by Research In Motion Limited Corp.

To provide for interaction with a user, user equipment 140 may include input device 106, output device 104, any other suitable device, or any combination thereof. In some embodiments, input device 106, output device 104, or both may be provided as stand-alone devices or integrated with other elements of user equipment 140.

In some embodiments, input device 106 may include hardware, software, or both. For example, input device 106 may include any suitable device or interface, such as a remote control, mouse, trackball, keypad, keyboard, touch screen, touch pad, stylus input, joystick, voice recognition interface, any other suitable input device or interface, or any combination thereof. For example, input device 106 may include a computer keyboard and mouse.

In some embodiments, input device 106 may be used to provide input data to processing equipment 102, any other suitable component, or any combination thereof. Input device 106 may provide access to or the ability to add an NRA to an undesired address database by, for example, selecting a selectable option provided in a display screen.

In some embodiments, input device 106 may provide access to or the ability to add an NRA to an undesired address database by, for example, pressing a dedicated button (e.g., a key on a keyboard, a mouse button, a soft key, any other suitable button, or any combination thereof). For example, NRA information may be stored in database 120 in response to a user pressing the left mouse button on a computer mouse.

In some embodiments, input device 106 may provide access to or the ability to add an NRA to an undesired address database by, for example, making a selection, inputting data, or both using a touchscreen, voice command, motion gesture (e.g., shaking, moving, making a gesture, any other suitable action, or any combination thereof), any other suitable option, or any combination thereof. For example, NRA information may be stored in database 120 in response to a user shaking a mobile phone when an NRA displayed on the mobile phone is undesired.

Output device 104 may include hardware, software, or both. Output device 104 may include one or more of a monitor, a television, a liquid crystal display (LCD) for a mobile device, a cathode ray tube (CRT) device, any other suitable equipment for providing visual images, or any combination thereof. For example, output device 104 may be a smartphone.

In some embodiments, one or more audio speakers may be provided as integrated with other elements of user equipment 140, such as output device 104, or may be stand-alone units. For example, output device 104 may be a computer monitor with integrated speakers.

Modules 112 may include any suitable software, hardware, or both. For example, modules 112 may include one or more types of storage devices, such as memory (e.g., random-access memory, read-only memory, synchronous dynamic random access memory, EPROM, EEPROM, flash memory devices, any other suitable memory, or any combination thereof), hard disks, magneto-optical disks, optical disks, any other suitable fixed or removable storage devices, or any combination thereof. In some embodiments, modules 112 may refer to any medium that participates in providing instructions to processing equipment 102 for execution. In some embodiments, the processing equipment and the memory may be supplemented by, or incorporated in, one or more application-specific integrated circuits (ASICs).

Modules 112 may include, for example, operating system 114 (e.g., Mac OS®, any other suitable operating system, or any combination thereof), network communication module 116, web browser application 118 (e.g., Apple Safari®), local undesired address database 120, audio engine 122, any other suitable applications 150, or any combination thereof.

Operating system 114 may be multi-user, multi-processing, multi-tasking, multi-threading, real-time, any other suitable configuration or implementation, or any combination thereof and may perform tasks, including but not limited to: recognizing input from and providing output to components 104, 106, 108, any other suitable component, or any combination thereof; managing files, directories, or both on modules 112, any other suitable memory or storage, or any combination thereof; controlling peripheral devices, any other suitable device, or any combination thereof; and managing communications path 110, any other suitable communications paths, or any combination thereof.

Network communications module 116 may include software, hardware, or both for establishing and maintaining network connections (e.g., software for implementing communication protocols, such as TCP/IP, HTTP, any other suitable software or hardware, or any combination thereof).

Web browser application 118 may include hardware, software, or both to implement a web browser window, web browser navigation controls, NRA controls, undesired address control, or any other suitable functionality.

In some embodiments, information associated with undesired addresses may be stored in local undesired address database 120 for use in identifying undesired address, providing NRA recommendations, providing any other suitable information, or any combination thereof. An undesired address may be, for example, a misspelled NRA, an advertisement-heavy web site (e.g., a "parked page", any other advertisement-heavy web site, or any combination thereof), a pay-per-click web site, a pay-per-lead web site, a web site with undesirable content, any other undesired address, web site, or program, or any combination thereof. Processing equipment may identify an undesired address by, for example, receiving information via an undesired address control, receiving information via a motion gesture, previewing a web site, processing one or more user histories, processing one or more undesired address databases, or by any other suitable technique.

Audio engine 122 may include any suitable software component, service, or both for receiving and processing audio signals received through network interface 108 or provided locally by a media player or other application. In some embodiments, an audio signal may be produced in association with an undesired address. An example audio engine 122 is CoreAudio®, included in Mac OS X operating system, developed by Apple Inc. (Cupertino, Calif., USA).

NRA Server 128 may include any capable hardware, software, or both. In some embodiments, NRA server 128 may include one or more computers and may be coupled to data network 124 through communications path 130. In some embodiments, system 100 may include undesired address database 132, which may include hardware, software, or both. For example, database 132 may include memory, storage, or both as described with reference to modules 112. NRA server 128 may be coupled to undesired address database 132 through communications path 134. In some embodiments, undesired address database 132 may include one or more separable databases coupled to server 128, each other, or both through any suitable communications path in accordance with some embodiments of the present disclosure.

Communications paths 130 and 134 may include any of the communications paths described above in connection with path 110 and 126 and may be exchanged over one or more communications paths, but are shown as single paths in FIG. 1 to avoid overcomplicating the drawing. Although communications between components 128 and 132 with user equipment 140 are shown as through data network 124, in some embodiments, components 128 and 132 may communicate directly with user equipment 140 via communications paths such as those described above in connection with paths 110 and 126.

The NRA management application may be either partially or wholly implemented on any suitable component or combination or components described with connection to system 100. In some embodiments, the NRA management application may be implemented in a computer system that may include a back-end component (e.g., a data server, any other suitable back-end component, or any combination thereof), a middleware component (e.g., an application server, an Internet server, any other suitable middleware component, or any combination thereof), a front-end component (e.g., a client computer having a graphical user interface or an Internet browser, any other suitable front-end component, or any combination thereof), any other suitable component, or any combination thereof. The components of system 100 may be part of a single installation or device capable of implementing the NRA management application and may be connected by any form or medium of communication, such as those described above in connection with paths 110, 126, 130, and 134 and data network 124.

In some embodiments, processing equipment 102 may execute instructions for the NRA management application. The NRA management application may be, for example, integrated into web browser application 118, operating system 114, any other suitable application, or any combination thereof. For example, the NRA management application may include or function with web browser application 118, any other suitable component, or any combination thereof. In some embodiments, the NRA management application may be a web browser plug-in.

In some embodiments, input device 106 may be used to provide input data to the NRA management application. For example, the NRA management application may receive NRA information, an undesired address command, or both via input device 106.

In response to an undesired address command, the NRA management application may store information associated with undesired addresses in an undesired address database (e.g., local undesired address database 120, undesired address database 132) for use in identifying undesired address, providing NRA recommendations, providing any other suitable information, or any combination thereof.

In some embodiments, the NRA management application may identify an undesired address. For example, the NRA management application may access undesired address database 132 through server 128 in response to receiving NRA information via input device 106. When the NRA management application receives an NRA, the address may be communicated, for example, to server 128 through data network 124.

In some embodiments, the NRA management application, server 128, or both may access database 132 in order to determine whether the address is an undesired address and, if so, which address recommendations to provide. For example, the NRA management application may identify a misspelled or advertisement-heavy web page as an undesired address and store data associated with the undesired address in an undesired address database (e.g., local undesired address database 120, undesired address database 132).

In some embodiments, the NRA management application may remove undesired addresses out of a listing of NRAs. For example, when an undesired address is received, the NRA management application may provide NRA recommendations that do not include the undesired address.

In some embodiments, the NRA management application may store undesired address information, user browsing histories, user preference information, any other suitable information, or any combination thereof in undesired address database 132, any other suitable database (e.g., local undesired address database 120), or any combination thereof. For example, the NRA management application may store user browsing preferences, browsing histories, or both in any suitable database.

Figure 2:
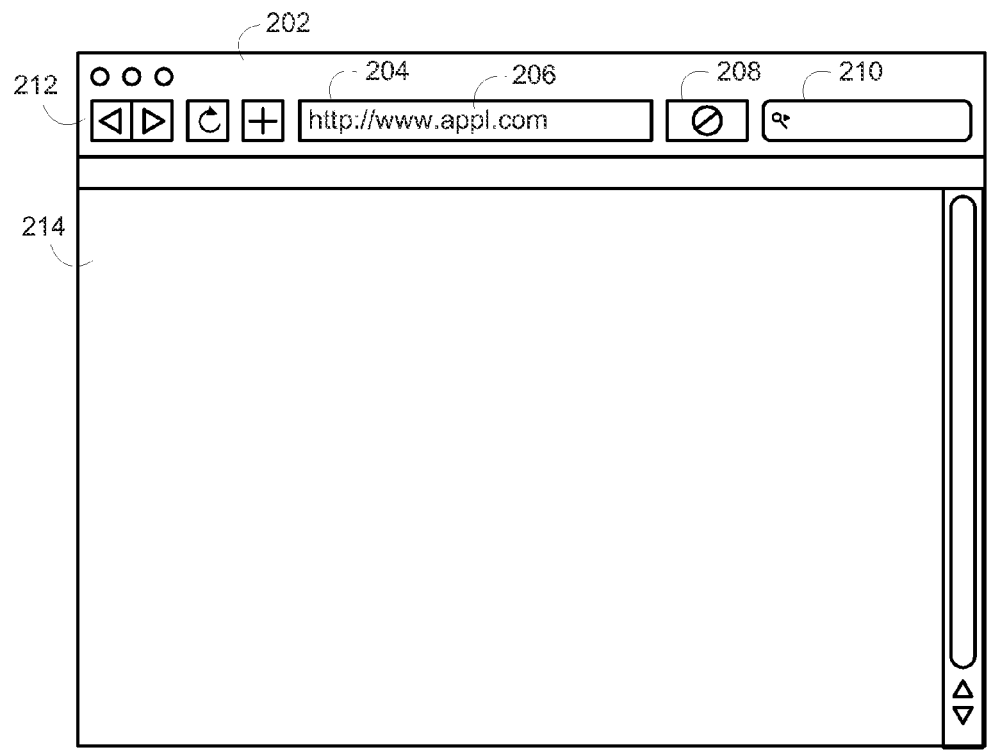
FIG. 2 shows an illustrative web browser display screen in accordance with some embodiments.

FIG. 2 shows an illustrative web browser display screen 200 for providing NRA management in accordance with some embodiments of the present disclosure. In some embodiments, an NRA management application may provide access to any suitable type of content in a single display, a single screen overlay, multiple displays, multiple screen overlays, any other suitable display, or any combination thereof and may or may not be updated at any suitable time interval.

In some embodiments, display screen 200 may include navigation region 202 for displaying one or more individually selectable portions, such as NRA field 204, NRA 206, undesired address control 208, search field 210, navigational controls 212 (e.g., back icon, forward icon, reload icon, cancel or stop icon, close icon, minimize icon, maximize icon, any other suitable icon, or any combination thereof), any other suitable field, icon, or button, or any combination thereof.

In some embodiments, input device 106 may be used to input an NRA, such as NRA 206 (e.g., "http//www.appl.com") in NRA field 204. The NRA management application may provide content associated with NRA 206, for example, in display region 214.

In some embodiments, the NRA management application may perform an undesired address control function in response to a user selecting a selectable option (e.g., undesired address control 208) in a display screen, pressing a dedicated button (e.g., a key on a keyboard, a mouse button, a soft key, any other suitable button, or any combination thereof) on an input device or any other suitable device, making a selection using a touchscreen or other input interface or device, making a selection or inputting data via voice command, making a motion gesture, any other suitable option, or any combination thereof.

In some embodiments, the NRA management application may identify an undesired address in response to a user selecting undesired address control 208 using, for example, input device 106. When undesired address control 208 is selected, for example, the NRA management application may store information associated with NRA 206, user browsing histories, user preference information, any other suitable information, or any combination thereof in a database. For example, the NRA management application may store information associated with the undesired address in local undesired address database 120 for use in providing recommended NRAs to user equipment 140 shown in FIG. 1. In some embodiments, the NRA management application may store information associated with the undesired address in undesired address database 132 for use in providing recommended NRAs to any suitable number of users via NRA server 128 and data network 124 shown in FIG. 1.

In some embodiments, display screen 200 may also include one or more display regions, one or more advertisements, one or more options regions, any other suitable region, or any combination thereof. In some embodiments, display screen 200 may be personalized in accordance with some embodiments of the present disclosure. It will be appreciated that the aforementioned features may be included in other display screens of the present disclosure.

Figure 3:
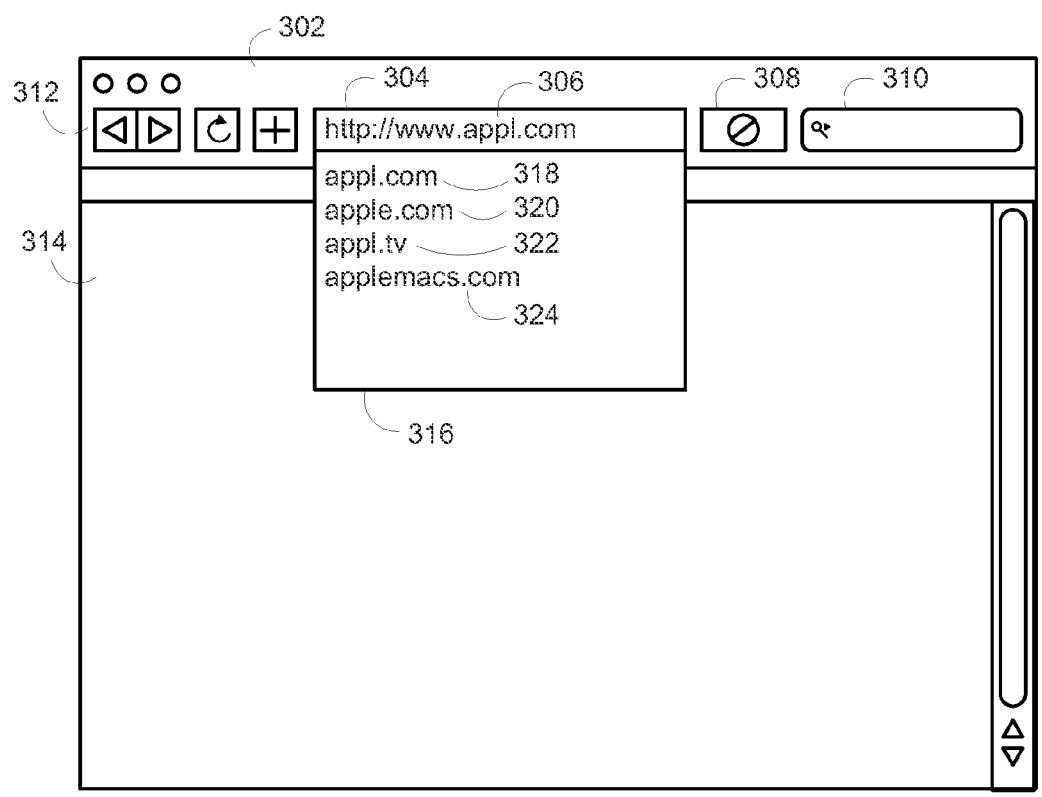
FIG. 3 shows an illustrative web browser display screen for displaying network resource address recommendations in accordance with some embodiments.

FIG. 3 shows an illustrative web browser display screen 300 for displaying NRA recommendations in accordance with some embodiments of the present disclosure. In some embodiments, display screen 300 may include navigation region 302 for displaying one or more individually selectable portions, such as NRA field 304, NRA 306, undesired address control 308, search field 310, navigational controls 312 (e.g., back icon, forward icon, reload icon, cancel or stop icon, close icon, minimize icon, maximize icon, any other suitable icon, or any combination thereof), any other suitable field, icon, or button, or any combination thereof.

In some embodiments, input device 106 may be used to input an NRA, such as NRA 306 (e.g., "appl") in NRA field 304. In some embodiments, the NRA management application may provide individually selectable NRA recommendations in drop-down box 316 based on information provided via, for example, NRA field 304. NRA recommendations in drop-down box 316 may be, for example, NRA recommendation 318 (e.g., "appl.com"), NRA recommendation 320 (e.g., "apple.com"), NRA recommendation 322 (e.g., "appl.tv"), NRA recommendation 324 (e.g., "applemacs.com"), any other suitable recommendation or NRA, or any combination thereof.

In some embodiments, input device 106 may be used to select an NRA recommendation. The NRA management application may provide content associated with one or more NRA recommendations, for example, in display region 314. For example, the NRA management application may provide content associated with NRA recommendation 318 (e.g., http://www.appl.com) in display region 314 in response to a user selecting NRA recommendation 318 (e.g., "appl.com").

Figure 4:
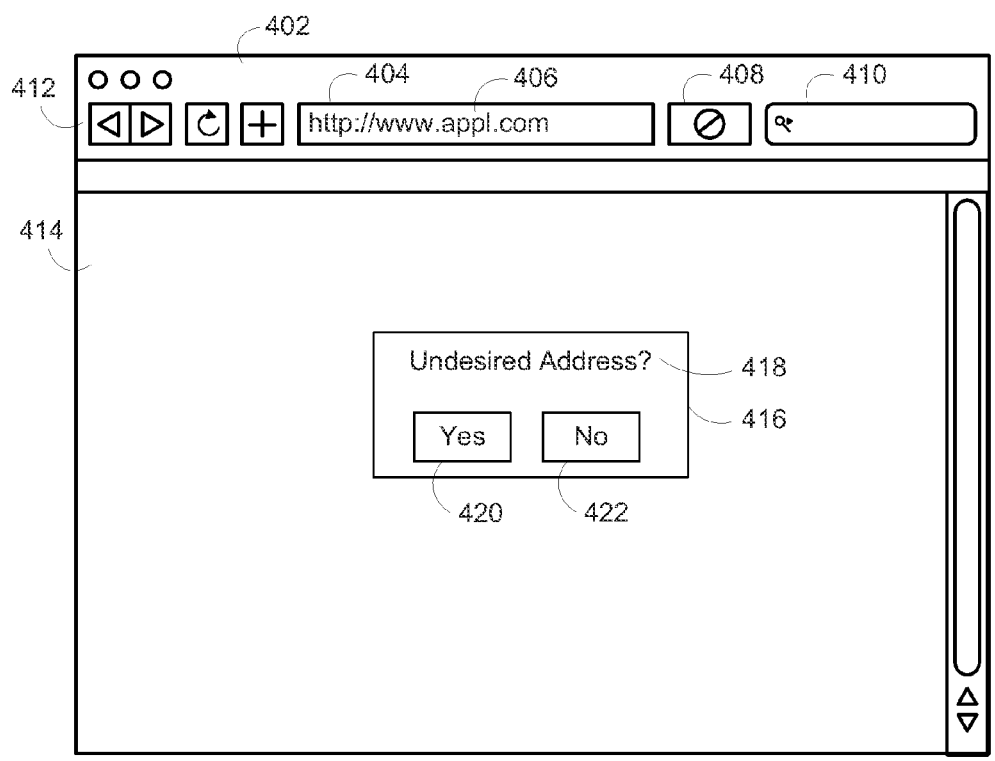
FIG. 4 shows an illustrative web browser display screen for updating an undesired address database in accordance with some embodiments.

FIG. 4 shows an illustrative web browser display screen 400 for updating an undesired address database in accordance with some embodiments of the present disclosure. In some embodiments, display screen 400 may include navigation region 402 for displaying one or more individually selectable portions, such as NRA field 404, NRA 406, undesired address control 408, search field 410, navigational controls 412 (e.g., back icon, forward icon, reload icon, cancel or stop icon, close icon, minimize icon, maximize icon, any other suitable icon, or any combination thereof), any other suitable field, icon, or button, or any combination thereof.

The NRA management application may provide access to or the ability to add information associated with an NRA to an undesired address database (e.g., local undesired address database 120, undesired address database 132). In some embodiments, display screen 400 may include undesired address control 408 for associating an NRA, such as an NRA in field 404, as an undesired address in accordance with some embodiments of the present disclosure. For example, NRA 406 (e.g., "http://www.appl.com") may be an undesired address and may have been input in field 404, selected from drop-down box 316 shown in FIG. 3, selected from a listing of web links, or arrived at though any other suitable process using input device 106. The NRA management application may provide content associated with NRA 406, for example, in display region 414.

In some embodiments, the NRA management application may provide confirmation region 416 in response to selection of undesired address control 408. Confirmation region 416 may be, for example, a single display region, a single screen overlay region, multiple display regions, multiple screen overlay regions, any other suitable display, or any combination thereof. In some embodiments, confirmation region 416 may be accompanied by informational header 418 (e.g., "Undesired Address?"), affirmative confirmation option 420 (e.g., "Yes"), negative confirmation option 422 (e.g., "No"), any other suitable feature or option, or any combination thereof. When affirmative confirmation option 420 is selected, for example, the NRA management application may store information associated with NRA 406, user browsing histories, user preference information, any other suitable information, or any combination thereof in a database. For example, the NRA management application may store information associated with the undesired address in local undesired address database 120 for use in providing recommended NRAs to user equipment 140 shown in FIG. 1.

In some embodiments, the NRA management application may store information associated with the undesired address in undesired address database 132 for use in providing recommended NRAs to any suitable number of users via NRA server 128 and data network 124 shown in FIG. 1. In some embodiments, the NRA management application may periodically store NRA information in any suitable temporary storage device (e.g., database 120, database 132) without receiving confirmation by the user. The NRA management application may delete NRA information the temporary storage device, return the display screen to a non-confirmation state, or both in response to the user selecting, for example, negative confirmation option 422.

In some embodiments, the NRA management application may provide confirmation region 416 in response to receiving more than one NRA within a predefined time window (e.g., a few seconds). For example, NRA 406 (e.g., "http://www.appl.com") may be an undesired address input in field 404 and may be followed almost immediately by the input of a desired address (e.g., "http://www.appl.com") in field 404. The NRA management application may determine, for example, that the first NRA corresponds to an undesired NRA and the last NRA corresponds to a desired NRA. The NRA management application may store information associated with the undesired address, desired address, or both, for example, in local undesired address database 120 for use in providing recommended NRAs to user equipment 140 shown in FIG. 1.

Figure 5:
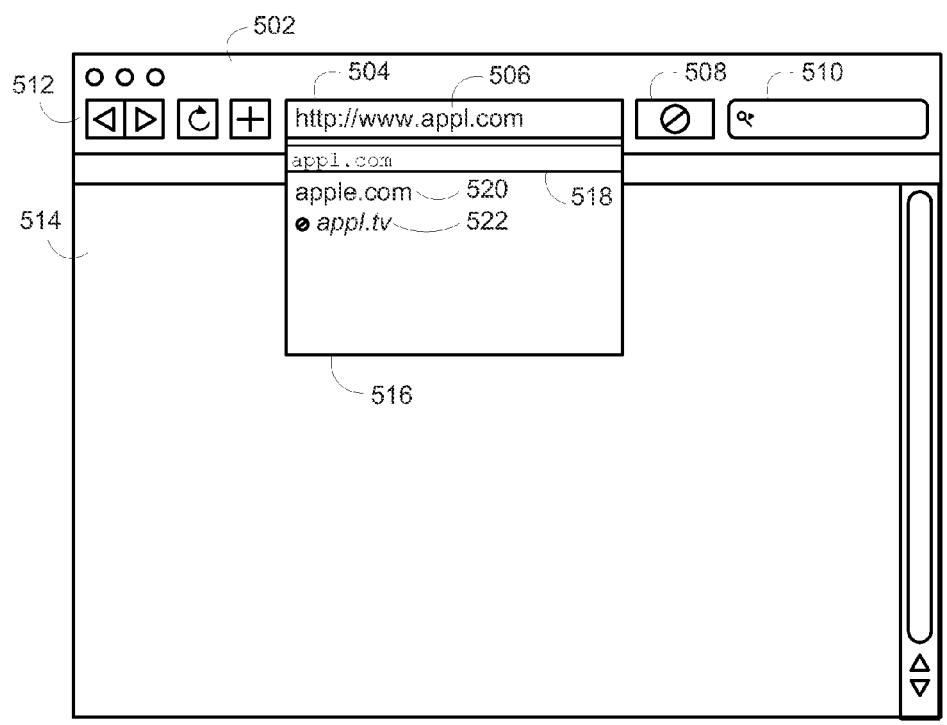
FIG. 5 shows an illustrative web browser display screen for displaying updated network resource address recommendations in accordance with some embodiments.

FIG. 5 shows an illustrative web browser display screen 500 for displaying updated NRA recommendations in accordance with some embodiments of the present disclosure. In some embodiments, display screen 500 may include navigation region 502 for displaying one or more individually selectable portions, such as NRA field 504, NRA 506, undesired address control 508, search field 510, navigational controls 512 (e.g., back icon, forward icon, reload icon, cancel or stop icon, close icon, minimize icon, maximize icon, any other suitable icon, or any combination thereof), any other suitable field, icon, or button, or any combination thereof.

In some embodiments, input device 106 may be used to input an NRA, such as NRA 506 (e.g., "appl") in NRA field 504. In some embodiments, the NRA management application may provide individually selectable NRA recommendations in drop-down box 516 based on information provided via, for example, NRA field 504. NRA recommendations in drop-down box 516 may be, for example, NRA recommendation 518 (e.g., "appl.com"), NRA recommendation 520 (e.g., "apple.com"), NRA recommendation 522 (e.g., "appl.tv"), any other suitable recommendation or NRA, or any combination thereof.

In some embodiments, the NRA management application may access an undesired address database (e.g., local undesired address database 120, undesired address database 132) to determine if NRA 506, NRA recommendations 518, 520, 522, any other suitable information, or any combination thereof is associated with an undesired address. The NRA management application may provide NRA recommendations that are not associated with undesired addresses. For example, the NRA management application may provide NRA recommendation 520 in drop-down box 516 in response to information associated with NRA recommendation 520 not being stored in an undesired address database.

In some embodiments, the NRA management application may provide an undesired address in drop-down box 516 in an altered form, such as being highlighted, having a different color, having a different font, having a different size, being co-located with a graphic icon, being differentiated in any other suitable manner, or any combination thereof.

For example, information associated with NRA recommendations 518 and 522 may be stored in an undesired database. The NRA management application may, for example, highlight and change the font and size of NRA recommendation 518 from Arial 12 point font to Courier New 10 point font. The NRA management application may, for example, italicize, add an icon, and change the color of NRA recommendation 522 from black to gray.

In some embodiments, the NRA management application may not provide an undesired address as an NRA recommendation in drop-down box 516 in response to information associated with the address being stored in an undesired address database. For example, the NRA management application may not provide "applemacs.com" as an NRA recommendation in drop-down box 516 in response to information associated with http://www.applemacs.com" being stored in local undesired address database 120, undesired address database 132, or both.

In some embodiments, input device 106 may be used to select an NRA recommendation. The NRA management application may provide content associated with one or more NRA recommendations, for example, in display region 514. For example, the NRA management application may provide content associated with NRA http://www.apple.com in display region 514 in response to a user selecting NRA recommendation 520 (e.g., "apple.com").

Figure 6:
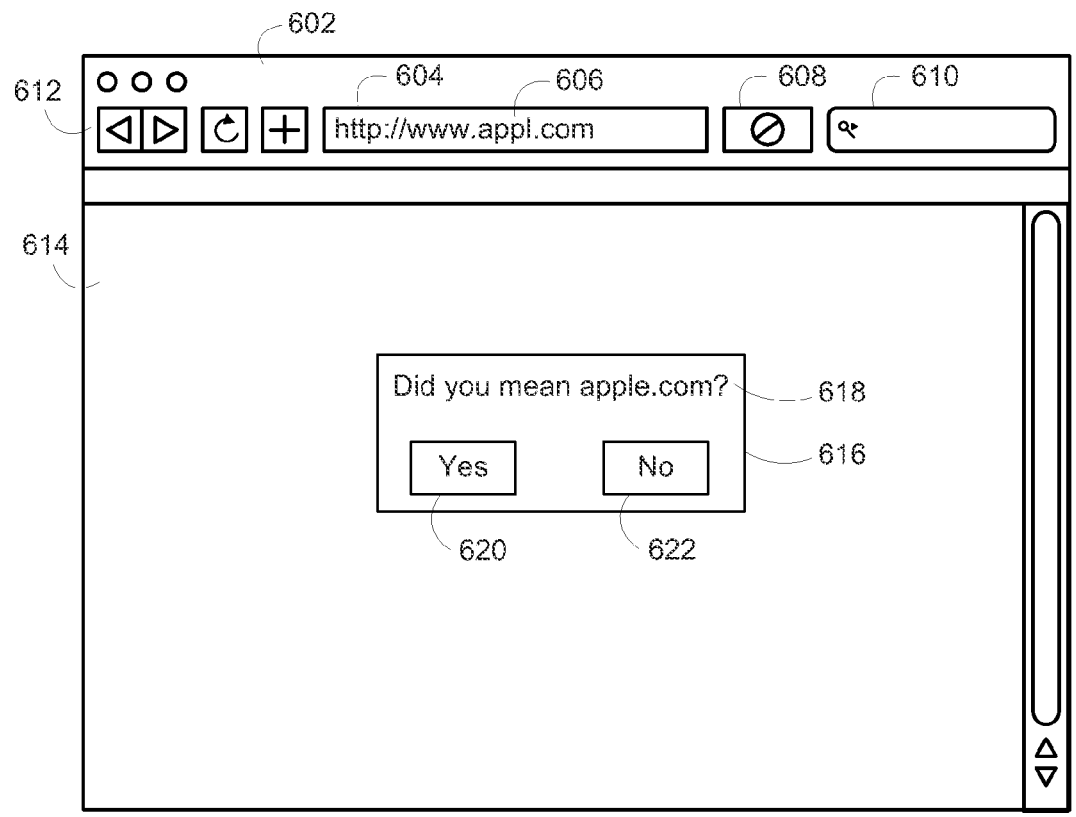
FIG. 6 shows an illustrative web browser display screen for confirming a network resource address recommendation in accordance with some embodiments.

FIG. 6 shows an illustrative web browser display screen 600 for confirming an NRA recommendation in accordance with some embodiments of the present disclosure. In some embodiments, display screen 600 may include navigation region 602 for displaying one or more individually selectable portions, such as NRA field 604, NRA 606, undesired address control 608, search field 610, navigational controls 612 (e.g., back icon, forward icon, reload icon, cancel or stop icon, close icon, minimize icon, maximize icon, any other suitable icon, or any combination thereof), any other suitable field, icon, or button, or any combination thereof.

In some embodiments, input device 106 may be used to input an NRA, such as NRA 606 (e.g., "http://www.appl.com") in NRA field 604. In accordance with some embodiments of the present disclosure, the NRA management application may provide NRA 606 in association with an NRA recommendation (e.g., an NRA recommendation in drop-down box 316 shown in FIG. 3, an NRA recommendation in confirmation box 616, any other suitable NRA, or any combination thereof). In some embodiments, the NRA management application may provide NRA 606 in association with an NRA link (e.g., a web link, any other suitable NRA link or pointer, or any combination thereof).

In some embodiments, the NRA management application may access an undesired address database (e.g., local undesired address database 120, undesired address database 132) to determine if NRA 606, any other suitable information, or any combination thereof is an undesired address. In some embodiments, NRA 606 (e.g., "http://www.appl.com") may be an undesired address and may be stored in an undesired address database.

In some embodiments, the NRA management application may provide an NRA recommendation via confirmation region 616. In some embodiments, confirmation region 616 may be a single display region, a single screen overlay region, multiple display regions, multiple screen overlay regions, any other suitable display, or any combination thereof. In some embodiments, confirmation region 616 may be accompanied by informational header 618 (e.g., "Do you mean apple.com?") that may include information (e.g., text, one or more images, any other suitable information, or any combination thereof) indicative of one or more recommended NRAs (e.g., http://www.apple.com). In some embodiments, confirmation region 616 may include affirmative confirmation option 620 (e.g., "Yes"), negative confirmation option 622 (e.g., "No"), any other suitable feature or option, or any combination thereof. When affirmative confirmation option 620 is selected, for example, the NRA management application may provide content associated with an NRA recommendation provided in informational header 618 in display region 614. In some embodiments, the NRA management application may provide an NRA associated with informational header 618 as an updated NRA 606 in field 604.

In some embodiments, in response to selection of affirmative confirmation option 620, the NRA management application may store information associated with NRA 606, user browsing histories, user preference information, NRA recommendation information associated with informational header 618, any other suitable information, or any combination thereof in any suitable database for use in providing NRA recommendations to user equipment 140 shown in FIG. 1. In some embodiments, the NRA management application may store NRA information in undesired address database 132 for use in providing recommended NRAs to any suitable number of users via NRA server 128 and data network 124 shown in FIG. 1. In some embodiments, the NRA management application may store an NRA recommendation in any suitable database and may associate the NRA recommendation with a corresponding undesired address for use in providing future NRA recommendations.

In some embodiments, in response to selection of negative confirmation option 622, the NRA management application may provide one or more additional NRA recommendations in, for example, confirmation box 616. For example, the NRA management application may provide a selectable field to input the desired NRA using input device 106. In some embodiments, in response to selection of negative confirmation option 622, the NRA management application may provide content associated with NRA 606 (e.g., "http://www.appl.com") in display region 614 and may or may not provide confirmation dialog (e.g., ask if the user would like to display content associated with NRA 606 even though it is an undesired address) to confirm this feature.

Figure 7:
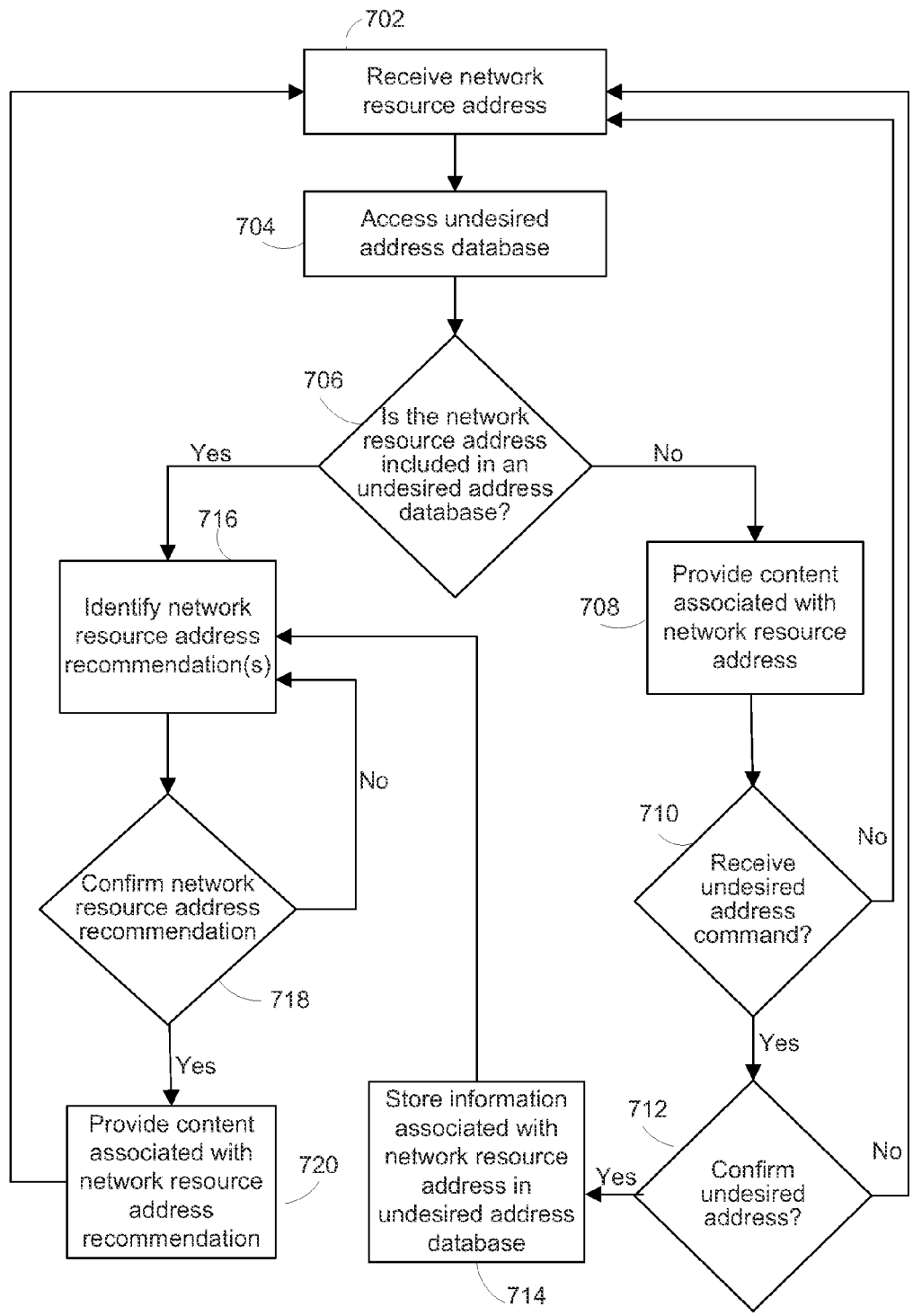
FIG. 7 is a flow chart of illustrative steps involved in directing a user to a desired network resource address in accordance with some embodiments.

FIG. 7 is a flow chart of illustrative steps involved in directing a user to a desired NRA in accordance with some embodiments of the present disclosure. In some embodiments, input device 106 may be used to input an NRA using an NRA management application which may be running on the Internet, one or more private networks, or both.

At step 702, the NRA management application may receive NRA information through any suitable communications path, network, or both in accordance with some embodiments of the present disclosure.

At step 704, the NRA management application may access one or more undesired address databases (e.g., local undesired address database 120, undesired address database 132, any other suitable database or storage including distributed storage locations, or any combination thereof) through any suitable communications path, network, or both in accordance with some embodiments of the present disclosure.

At step 706, the NRA management application may determine if the NRA information, any other suitable information, or any combination thereof is associated with an undesired address. For example, the NRA management application may access an undesired address database (e.g., local undesired address database 120, undesired address database 132) to determine if NRA 606 shown in FIG. 6 is associated with an undesired address. If the NRA management application determines that the NRA information, any other suitable information, or any combination thereof is associated with an undesired address, the process may proceed to step 708. If the NRA management application determines that the NRA information, any other suitable information, or any combination thereof is not associated with an undesired address, the process may proceed to step 716.

At step 708, the NRA management application may provide content associated with the received NRA information, any other suitable information, or any combination thereof to user equipment 140, any other suitable equipment or device, or any combination thereof through any suitable communications path, network, or both in accordance with some embodiments of the present disclosure. For example, the NRA management application may provide content associated with NRA 606 in display region 614.

At step 710, the NRA management application may determine if an undesired address command has been received. For example, the NRA management application may receive the undesired address control command via undesired address control 608, any other suitable process or component, or any combination thereof. In some embodiments, the NRA management application may receive the undesired address control command via a time-based input of NRAs, such as the input of two NRAs within a predefined time window. The NRA management application may receive an undesired address command through any suitable communications path, network, or both in accordance with some embodiments of the present disclosure. If the NRA management application has not received an undesired address command, the process may proceed to step 702. If the NRA information, any other suitable information, or any combination thereof has been identified as an undesired address, the process may proceed to step 712.

At step 712, the NRA management application may confirm whether the NRA information is to be included in an undesired address database. For example, the NRA management application may provide confirmation region 616 (e.g., "Undesired Address?") in response to selection of undesired address control 608. If the NRA management application has not received confirmation (e.g., by selecting negative confirmation option 622, by not receiving input after a predetermined time interval), the process may proceed to step 702. If the NRA management application has received confirmation (e.g., by selecting affirmative confirmation option 620), the process may proceed to step 714.

At step 714, the NRA management application may store information associated with the NRA, user browsing histories, user preference information, any other suitable information, or any combination thereof in a database (e.g., local undesired address database 120, undesired address database 132) via any suitable communications path, network, or both in accordance with some embodiments of the present disclosure.

At step 716, the NRA management application may identify one or more NRA recommendations based on the NRA information, information stored in an undesired address database, or both. For example, the NRA management application may provide individually selectable NRA recommendations in a drop-down box in accordance with information in an NRA field, undesired address database, any other suitable information, or any combination thereof. The NRA management application may identify, provide, or confirm NRA recommendations using any suitable communications path, network, or both in accordance with some embodiments of the present disclosure.

At step 718, the NRA management application may confirm whether an NRA recommendation is a desired NRA. The NRA management application may confirm an NRA recommendation, for example, in response to a user selecting an NRA recommendation, such as an NRA recommendation associated with informational header 618, or affirmative confirmation option 620. In some embodiments, the NRA management application may not confirm an NRA recommendation in response to a user selecting negative confirmation option 622. If the NRA management application has not confirmed the NRA recommendation, the process may proceed to step 716. If the NRA management application has confirmed the NRA recommendation, the process may proceed to step 720.

At step 720, the NRA management application may provide content associated with the confirmed NRA recommendation, any other suitable information, or any combination thereof to user equipment 140, any other suitable equipment or device, or any combination thereof through any suitable communications path, network, or both in accordance with some embodiments of the present disclosure. For example, the NRA management application may provide content associated with an NRA recommendation associated with informational header 618 in display region 614.

Figure 8:
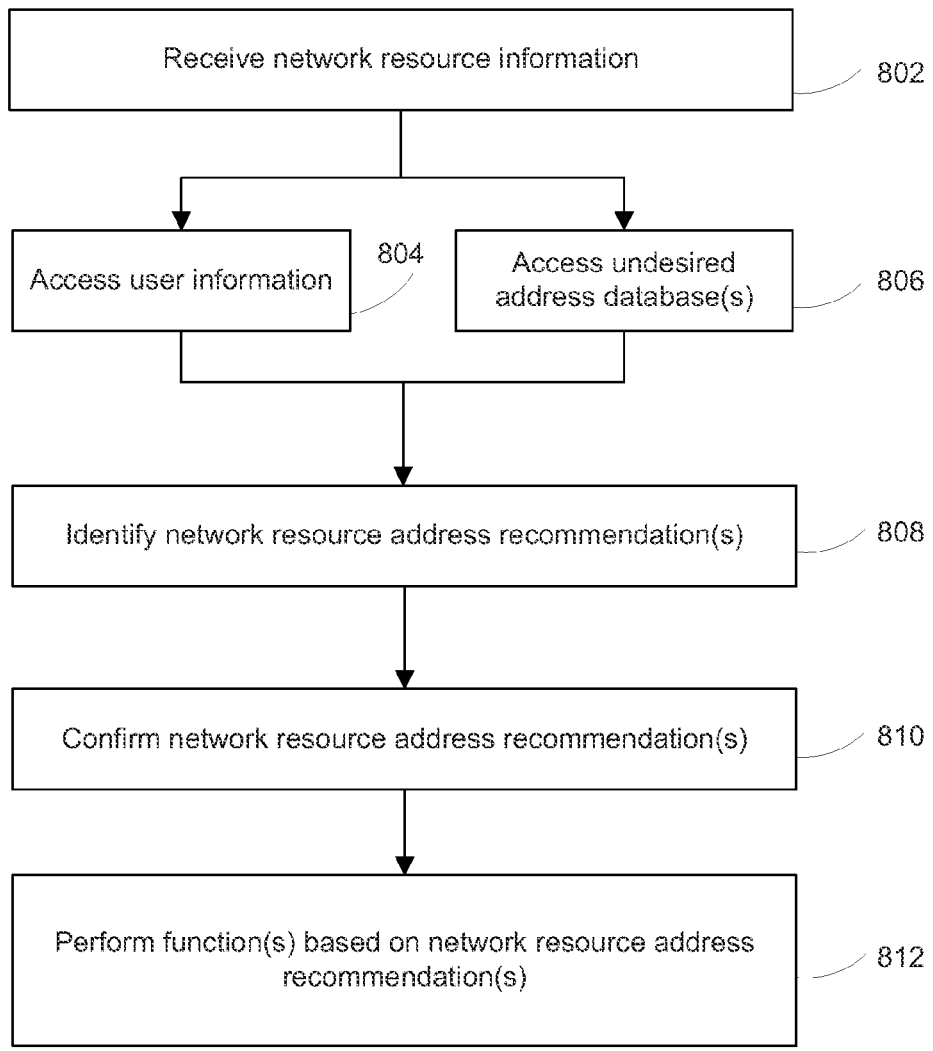
FIG. 8 is a flow chart of illustrative steps involved in performing a function based on an undesired address database in accordance with some embodiments.

FIG. 8 is a flow chart of illustrative steps involved in performing a function based on an undesired address database in accordance with some embodiments of the present disclosure. In some embodiments, input device 106 may be used to input an NRA using an NRA management application which may be running on the Internet, one or more private networks, or both.

At step 802, the NRA management application may receive NRA information through any suitable communications path, network, or both in accordance with some embodiments of the present disclosure. For example, the NRA management application may receive NRA information via NRA field 504 shown in FIG. 5, any other suitable field, program, or application, or any combination thereof.

At step 804, the NRA management application may access user information such as user browsing histories, user preference information, any other suitable information, or any combination thereof stored in any suitable database or storage device through any suitable communications path, network, or both in accordance with some embodiments of the present disclosure.

At step 806, the NRA management application may access one or more undesired address databases (e.g., local undesired address database 120, undesired address database 132, any other suitable database or storage including distributed storage locations, or any combination thereof) through any suitable communications path, network, or both in accordance with some embodiments of the present disclosure.

At step 808, the NRA management application may identify one or more NRA recommendations based on the NRA information, user information, information stored in an undesired address database, any other suitable information, or any combination thereof. For example, the NRA management application may provide individually selectable NRA recommendations, such as NRA recommendation 520, in drop-down box 516 in accordance with information provided via, for example, NRA field 504, database 120, database 132, any other suitable component, or any combination thereof.

At step 810, the NRA management application may confirm the one or more NRA recommendations. For example, the NRA management application may confirm an NRA recommendation in response to a user selecting NRA recommendation 520. In some embodiments, the NRA management application may not confirm an NRA recommendation in response to a user selecting a negative confirmation option or by not receiving input after a predetermined time interval.

At step 812, the NRA management application may perform a function based at least in part on the one or more confirmed NRA recommendations. In some embodiments, the NRA management application may provide content associated with the confirmed NRA recommendation, any other suitable information, or any combination thereof to user equipment 140 through any suitable communications path, network, or both in accordance with some embodiments of the present disclosure. For example, the NRA management application may provide content associated with NRA recommendation 520 in display region 514. In some embodiments, the NRA management application may display an image, video, or both to alert a user of any suitable outcome, such as the input of NRA information associated with an undesired address or the successful storing of information in an undesired address database. In some embodiments, the NRA management application may play an audio file to alert a user of any suitable outcome, such as the input of NRA information associated with an undesired address or the successful storing of information in an undesired address database.

In some embodiments, the NRA management application may filter search results associated with user-specified search parameters (e.g., text, search strings, keywords, partial or complete NRA information, any other suitable parameter, or any combination thereof). The NRA management application may, for example remove undesired addresses from a listing of search results resulting from the user-specified search parameters.

Figure 9:
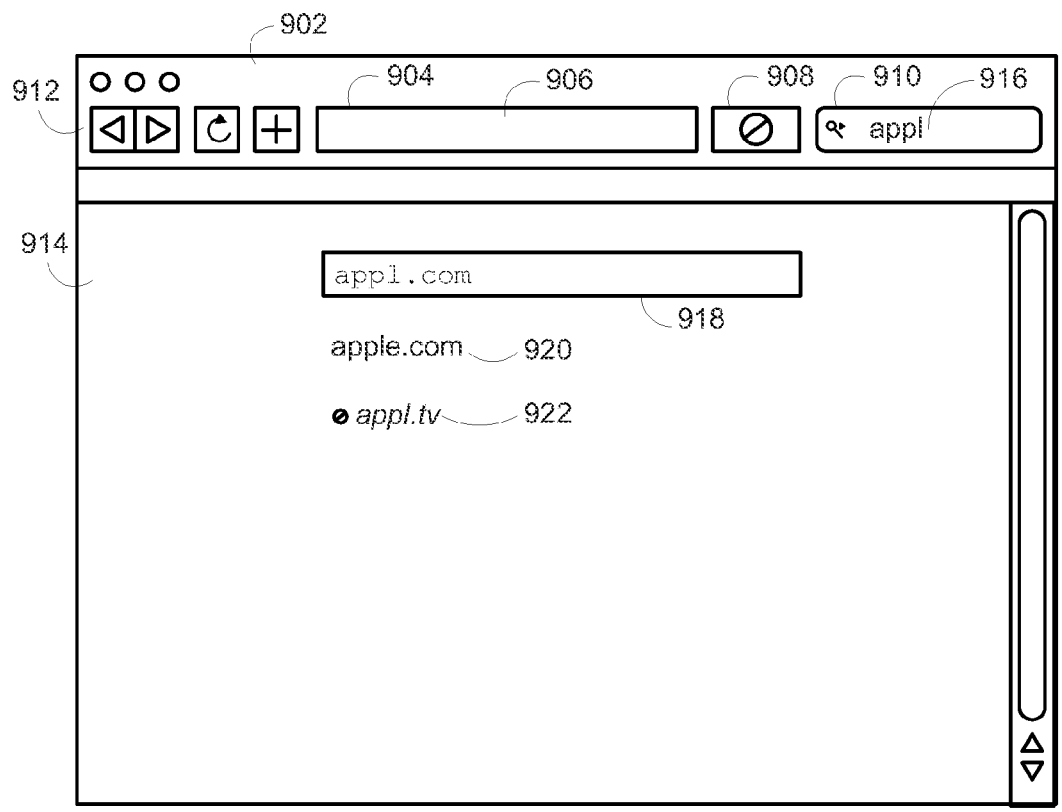
FIG. 9 shows an illustrative web browser display screen for providing search results in accordance with some embodiments.

FIG. 9 shows an illustrative web browser display screen 900 for providing filtered search results in accordance with some embodiments of the present disclosure. In some embodiments, an NRA management application may provide access to any suitable type of content in a single display, a single screen overlay, multiple displays, multiple screen overlays, any other suitable display, or any combination thereof and may or may not be updated at any suitable time interval.

In some embodiments, display screen 900 may include navigation region 902 for displaying one or more individually selectable portions, such as NRA field 904, NRA 906, undesired address control 908, search field 910, navigational controls 912 (e.g., back icon, forward icon, reload icon, cancel or stop icon, close icon, minimize icon, maximize icon, any other suitable icon, or any combination thereof), any other suitable field, icon, or button, or any combination thereof.

In some embodiments, the NRA management application may receive search parameters. For example, an input device may be used to input search parameter 916 (e.g., "appl") in search field 910.

In some embodiments, the NRA management application may provide content or listings associated with search parameters entered in search field 910, any other suitable search field or provider, or any combination thereof in display region 914. For example, if the NRA management application receives search parameter 916 in search field 910, the NRA management application may provide individually selectable listings, content, or both associated with NRAs in display region 314. Search result listings may be, for example, listings 918 (e.g., "appl.com"), 920 (e.g., "apple.com"), and 922 (e.g., "appl.tv").

In some embodiments, the NRA management application may access an undesired address database (e.g., local undesired address database 120, undesired address database 132) to determine if a search result listing, any other suitable information, or any combination thereof is associated with an undesired address.

In some embodiments, the NRA management application may provide search result listings that are not associated with undesired addresses. For example, the NRA management application may provide search result listing 920 in display region 914 in response to information associated with search result listing 920 not being stored in an undesired address database.

In some embodiments, the NRA management application may provide an undesired address as a search result listing in an altered form, such as being highlighted, having a different color, having a different font, having a different size, being co-located with a graphic icon, being differentiated in any other suitable manner, or any combination thereof.

For example, information associated with NRA recommendations 918 and 922 may be stored in an undesired database. The NRA management application may, for example, highlight and change the font and size of NRA recommendation 918 from Arial 12 point font to Courier New 10 point font. The NRA management application may, for example, italicize, add an icon, and change the color of NRA recommendation 922 from black to gray.

In some embodiments, the NRA management application may remove an undesired address from search result listings in response to information associated with the address being stored in an undesired address database. For example, the NRA management application may not provide "applemacs.com" as search result listing in display region 914 in response to information associated with http://www.applemacs.com" being stored in local undesired address database 120, undesired address database 132, or both.

In some embodiments, input device 106 may be used to select a search result listing. The NRA management application may provide content associated with one or more search result listings, for example, in display region 914. For example, the NRA management application may provide content associated with NRA http://www.apple.com in display region 914 in response to a user selecting NRA recommendation 920 (e.g., "apple.com").

Figure 10:
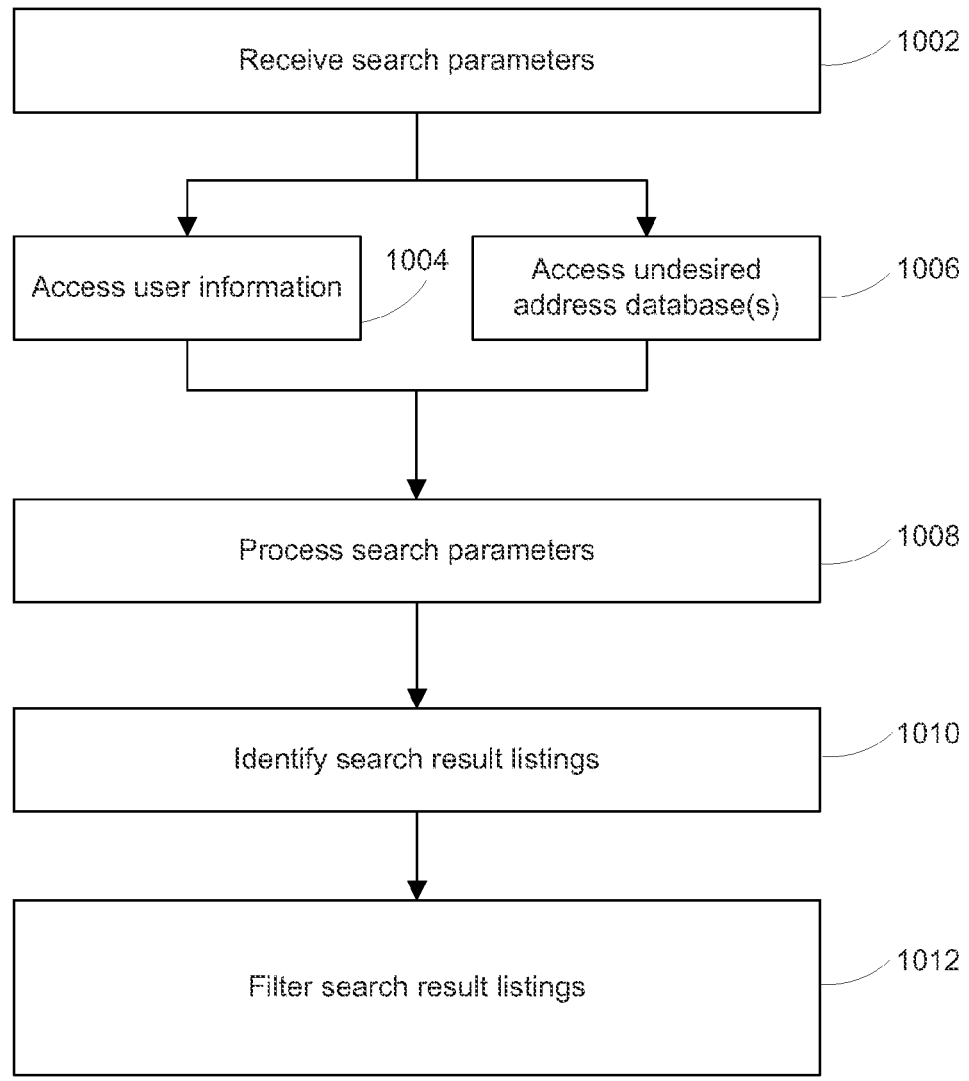
FIG. 10 is a flow chart of illustrative steps involved in filtering search results based on an undesired address database in accordance with some embodiments.

FIG. 10 is a flow chart of illustrative steps involved in filtering search results based on an undesired address database in accordance with some embodiments of the present disclosure. In some embodiments, input device 106 may be used to input search parameters using an NRA management application which may be running on the Internet, one or more private networks, or both.

At step 1002, the NRA management application may receive search parameters through any suitable communications path, network, or both in accordance with some embodiments of the present disclosure. For example, the NRA management application may receive search parameters via search field 510 shown in FIG. 5, any other suitable field, program, or application, or any combination thereof.

At step 1004, the NRA management application may access user information such as user browsing histories, user preference information, any other suitable information, or any combination thereof stored in any suitable database or storage device through any suitable communications path, network, or both in accordance with some embodiments of the present disclosure.

At step 1006, the NRA management application may access one or more undesired address databases (e.g., local undesired address database 120, undesired address database 132, any other suitable database or storage including distributed storage locations, or any combination thereof) through any suitable communications path, network, or both in accordance with some embodiments of the present disclosure.

At step 1008, the NRA management application may process the search parameters using any suitable search algorithm. The searching process may be generalized, for example, by communications paths 110, 126, 130, and 134, and data network 124. In some embodiments, the searching process may include other servers, databases, or both coupled with data network 124.

At step 1010, the NRA management application may identify one or more search result listings based on the search parameters, user information, information stored in an undesired address database, any other suitable information, or any combination thereof. For example, the NRA management application may provide individually selectable search result listings in display region 514 in accordance with information in search field 510, database 120, database 132, any other suitable component, or any combination thereof.

At step 1012, the NRA management application may filter search result listings according to user information, information stored in one or more undesired address databases, any other suitable information, or any combination thereof. In some embodiments, the NRA management application may remove a search result listing associated with an undesired address from a listing of search results. For example, the NRA management application may filter undesired addresses (e.g., "http://www.appl.com", any other suitable listing or content, or any combination thereof) out of search result listings provided in display region 514. In some embodiments, the NRA management application may provide undesired addresses as search result listings in altered form, such as being highlighted, having different colors, having different fonts, being co-located with graphic icons, being differentiated in any other suitable manner, or any combination thereof.

It will be understood that the foregoing is only illustrative of the principles of the disclosure, and that the disclosure may be practiced by other than the described embodiments, which are presented for purposes of illustration and not of limitation.

What is claimed is:

1. A method for identifying an undesired network resource address, the method comprising:
  receiving from a user input device, information corresponding to a first user-specified network resource address;
  while data corresponding to the first user-specified network resource address is presented on a display screen, receiving from the user input device, an undesired address control command identifying the first user-specified network resource address as an undesired network resource address, wherein the undesired address control command is received within a predefined time window beginning after the first-user specified network resource address is received, and the undesired address control command identifies a second user-specified network resource address, different than the first user-specified network resource address; and
  storing data indicative of the first user-specified network resource address in an electronic database in response to the undesired address control command.

2. The method of claim 1, further comprising associating with electronic processing equipment the first user-specified network resource address with an intended network resource address in the electronic database.

3. The method of claim 1, wherein the electronic database contains information indicative of network resource addresses identified as being undesired network resource addresses based at least in part on past actions performed by a user.

4. A system comprising:
  a processor; and
  a memory containing instructions that, when executed, cause the processor to:
    receive from, a user input device, information corresponding to a first user-specified network resource address;
    while data corresponding to the first user-specified network resource address is presented on a display screen, receive, from the user input device, an undesired address control command identifying the first user-specified network resource address as an undesired network resource address, wherein the undesired address control command is received within a predefined time window beginning after the first-user specified network resource address is received, and the undesired address control command identifies a second user-specified network resource address, different than the first user-specified network resource address; and
    store data indicative of the first user-specified network resource address in an electronic database in response to the user selection.

5. The system of claim 4, wherein the instructions further cause the processor to:
associate the first user-specified network resource address with an intended network resource address in the electronic database.

6. The system of claim 4, wherein the electronic database contains information indicative of network resource addresses identified as being undesired network resource addresses based at least in part on past actions performed by a user.

7. A non-transitory computer-readable medium containing instructions that, when executed by a computing device, cause the computing device to:
receive from, a user input device, information corresponding to a first user-specified network resource address;
while data corresponding to the first user-specified network resource address is presented on a display screen, receive, from the user input device, an undesired address control command identifying the first user-specified network resource address as an undesired network resource address, wherein the undesired address control command is received within a predefined time window beginning after the first-user specified network resource address is received, and the undesired address control command identifies a second user-specified network resource address, different than the first user-specified network resource address; and
store data indicative of the first user-specified network resource address in an electronic database in response to the user selection.

8. The non-transitory computer-readable medium of claim 7, wherein the instructions further cause the computing device to:
associate the first user-specified network resource address with an intended network resource address in the electronic database.

9. The non-transitory computer-readable medium of claim 7, wherein the electronic database contains information indicative of network resource addresses identified as being undesired network resource addresses based at least in part on past actions performed by a user.

* * * * *